United States Patent [19]

Doebler et al.

[11] Patent Number: 5,389,406
[45] Date of Patent: Feb. 14, 1995

[54] PROCESS FOR THE PRODUCTION OF MULTILAYER COATINGS

[75] Inventors: Klaus-Peter Doebler, Radevormwald; Wolfgang Göldner, Heiligenhaus; Matthias Kimpel, Schwelm; Klausjörg Klein, Wuppertal, all of Germany

[73] Assignee: Herberts Gesellschaft mit beschrankter Haftung, Wuppertal, Germany

[21] Appl. No.: 136,588

[22] Filed: Oct. 14, 1993

[30] Foreign Application Priority Data

Oct. 23, 1992 [DE] Germany ............................ 4235778

[51] Int. Cl.⁶ ........................... B05D 1/36; B05D 7/00
[52] U.S. Cl. ............................ 427/407.1; 204/181.1; 427/409; 427/410; 427/412.1
[58] Field of Search ............ 204/181.1; 427/379, 427/407.1, 409, 410, 412.1

[56] References Cited

U.S. PATENT DOCUMENTS 4,988,420 11/1991 Batzill et al. .................. 204/181.1
5,120,415 6/1992 Yuan ........................... 427/409 X
5,229,210 7/1993 Kasukawa et al. .......... 204/181.1 X

*Primary Examiner*—Michael Lusignan
*Attorney, Agent, or Firm*—Schweitzer Cornman & Gross

[57] ABSTRACT

A process is described for producing multilayer coatings in which a first coating layer of a first aqueous coating medium is applied to an electrically conducting substrate by electrophoretic deposition, is provided wet-in-wet with a second coating layer of a second aqueous coating medium, followed by joint stoving, wherein a coating medium based on one or more vehicles stabilised by ionic groups and which crosslink on stoving with the formation of urethane groups is used for the second coating layer, and the coating media are selected so that the maximum pigment/vehicle weight ratio of the first coating medium is 1:1, that the ratio of the pigment/vehicle weight ratio of the first coating medium to that of the second coating medium is up to 1.8, and the minimum stoving temperature interval of the second coating layer is above that of the first coating layer or overlaps the latter so that the lower limit of the interval for the second coating layer is above the lower limit of the interval for the first coating layer.

15 Claims, No Drawings

PROCESS FOR THE PRODUCTION OF MULTILAYER COATINGS

BACKGROUND OF THE INVENTION

This invention relates to a process for the production f multilayer coatings by the wet-in-wet application of an ionically stabilised water-thinnable coating medium to an uncrosslinked, previously electrophoretically deposited lacquer layer, followed by the joint stoving of these lacquer layers.

Industrial lacquer-coating is characterised by efforts to optimise the coating process with regard to its environmental compatibility and energy consumption. Routes to this objective comprise, for example, the use of aqueous lacquer systems and cutting down on energy-intensive process steps, such as reducing the number of stoving steps, for example. In this respect it is customary, in the stoving steps for the individual layers, for the stoving temperatures of subsequent layers to be lower than those of the previous layers in order that the lower lacquer layers are not subjected to too severe a thermal loading.

DE-A-36 06 028 describes a coating process for the production of a two-layer coating, in which after applying a cataphoretically deposited primer coat a second layer is applied wet-in-wet and both layers are thereafter jointly stoved. The material for the covering layer is not water-thinnable; it contains organic solvents and consists of a resin which contains hydroxyl groups, a polyisocyanate compound and additives.

JP-B-91 021 227 describes a three-layer coating with the wet-in-wet application of a water-thinnable stone impact protection layer, which is based on polyester and is cross-linkable with a melamine resin, on to an unhardened electro-dip lacquer layer having a water content of less than 40%.

In this system, one coating layer has to comprise a pulverulent organic resin dispersed in an aqueous vehicle.

US-A-4 537 926 describes water-thinnable stone chip protection materials which can optionally be applied to uncrosslinked electro-dip lacquer layers and which can be stoved jointly with the latter. Copolymers based on unsaturated monomers serve as the basis for the vehicle of the stone impact protection layer. Thermoplastic polymers are described, which means that these stone impact protection materials remain uncrosslinked after being stoved jointly with the electro-dip lacquer.

German Patent Application 41 25 459, which has not yet been laid open to public inspection, describes aqueous coating materials containing special organic polymer powders. These may be applied to various primer coats; it is also mentioned that they may optionally be applied wet-in-wet on to uncrosslinked cataphoretically deposited films. The stoved extender layers obtained give rise to problems of subsequent processability, e.g. during polishing.

DE-A-41 26 476 describes a production process for a multilayer coating comprising the wet-in-wet application of an aqueous, anionically stabilised, amine resin crosslinking coating material based on an optionally urethanised polyester on to a previously cataphoretically deposited layer, followed by joint stoving. The cataphoretically deposited film should undergo a maximum weight loss of 10 weight % on stoving. The substrate can thereafter optionally be provided with a finishing coat. Multilayer lacquer coatings of this type are unsatisfactory as regards their mechanical properties, such as elasticity, resistance to stone impact and the bonding of intermediate layers. The restrictions imposed on the weight loss of the lower cataphoretically deposited lacquer layer are particularly troublesome. However, these are necessary in order that no defects are obtained in the upper layer.

SUMMARY OF THE PRESENT INVENTION

The object of the present invention is accordingly to provide a process for the production of a multilayer coating with the wet-in-wet application of an aqueous coating medium on to an unhardened electro-dip lacquer layer and with joint stoving, which results in coatings with good intermediate layer bonding, improved subsequent processability and good mechanical properties, such as good elasticity, reduced sensitivity to stone impact, and a good, defect-free surface structure.

It has been shown that this object can be achieved if the aqueous coating media for the second layer crosslink with the formation of urethane groups and certain conditions are maintained with respect to the pigment-/vehicle ratios and the minimum stoving temperature of the coating media of the first and second layers.

Accordingly, the present invention relates to a process for producing multilayer coatings by the electrophoretic deposition of a first coating layer of a first aqueous coating medium on an electrically conducting substrate, the application of a second coating layer based on a second aqueous coating medium, and jointly stoving the coating layers thus obtained, which is characterised in that a coating medium is used for the second coating layer which is based on one or more vehicles stabilised by ionic groups in the aqueous coating medium, which cross-link during stoving with the formation of urethane groups and optionally urea groups, and the coating medium is selected so that the maximum pigment/vehicle weight ratio of the first coating medium is 1:1, that the ratio of the pigment/vehicle weight ratio of the first coating medium to the pigment/vehicle weight ratio of the second coating medium has a value of up to 1.8, for example from 0 to 1.8, preferably up to 1.0, and that the minimum stoving temperature interval for the second coating layer is above that for the first coating layer or overlaps the latter so that the lower limit of the interval for the second coating layer is above the corresponding lower limit for the first coating layer.

The minimum stoving temperature interval denotes the range from 10° C. below to 10° C. above the lowest temperature which is required, at a stoving duration of 20 minutes, in order to effect crosslinking of the lacquer layer concerned. The state of crosslinking may be determined, for example, by the effect of acetone on the stoved lacquer layer followed by a scratching test. The procedure for this may be as follows:

DETAILED DESCRIPTION OF THE INVENTION

A swab soaked in acetone is placed on the stoved lacquer layer, which has been stored for at least 4 hours, and covered with a watch glass. After 2 minutes the watch glass and swab are removed and a further minute is allowed to elapse. If the lacquer layer exhibits no changes when assessed with the naked eye, and if the lacquer layer cannot be removed by simple mechanical means such as scratching with a blunt object, for example scratching with a thumbnail or the blunt end of a horn spatula, subject to a pressure of 4 kg, crosslinking has occurred. This test is repeated on a series of coated test coupons which have each been stoved for 20 minutes at different temperatures, in order to determine the minimum stoving temperature. The range which extends from 10° C. above to 10° C. below the minimum stoving temperature determined in this manner is then defined as the minimum interval. In this connection it is understood that the test on the two layers to be investigated (the layer comprising the first coating medium and the layer comprising the second coating medium) is performed under the same conditions each time.

In the process according to the invention, electro-dip lacquers (ETL) which are known in the art, which can be deposited anodically or cathodically and which are subject to no particular restriction, can be used as the electrophoretically deposited coating media. These are aqueous coating media with a solids content of 10–20 weight %, for example. They consist of the usual vehicles which comprise ionic groups, or substituents which can be converted into ionic groups, and groups capable of chemically crosslinking, and optionally pigments and other additives. The ionic groups may be anionic groups or groups which can be converted into anionic groups, e.g. COOH groups, or cationic groups or groups which can be converted into cationic groups, e.g. amino, ammonium, e.g. quaternary ammonium, phosphonium and/or sulphonium groups. Vehicles with basic groups are preferred. Nitrogen-containing basic groups are particularly preferred. These groups may exist in quaternary form or are converted into ionic groups with the usual neutralising agents, e.g. an organic monocarboxylic acid such as formic acid or acetic acid, for example, as is familiar to one skilled in the art.

Examples of electro-dip lacquer vehicles and lacquers (ATL) which contain anionic groups and can be deposited anodically and which can be used according to the invention are described in DE-A 28 24 418. For example, these comprise vehicles based on polyesters, epoxy resin esters, poly (meth) acrylates, maleinate oils or polybutadiene oils with a weight average molecular weight of 300–10,000 for example and an acid number of 35–300 mg KOH/g. The vehicles contain —COOH, —SO$_3$H and/or PO$_3$H$_2$ groups. The resins can be converted to an aqueous phase after neutralisation of at least part of the acid groups. The lacquers may also contain the usual crosslinking agents, e.g. triazine resins, crosslinking agents containing groups capable of transesterification, or blocked polyisocyanates.

However, cathodic electro-dip lacquers (KTL) based on cationic or basic vehicles are preferred. Basic resins such as these are resins which contain primary, secondary or tertiary amino groups, for example, the amine numbers of which are 20 to 250 mg KOH/g, for example. The weight average molecular weight (M$w$) of the base resin is preferably 300 to 10,000. Examples of such base resins comprise aminoacrylate resins, aminoepoxy resins, aminoepoxy resins with terminal double bonds, aminoepoxy resins with primary OH groups, aminopolyurethane resins, polybutadiene resins containing amino groups or modified epoxy resin-carbon dioxide-amine reaction products. These base resins may be self-crosslinking or are used in admixture with known crosslinking agents. Examples of such crosslinking agents include aminoplast resins, blocked polyisocyanates, crosslinking agents with terminal double bonds, polyepoxy compounds, or crosslinking agents which contain groups capable of transesterification.

Examples of base resins and crosslinking agents used in cathodic immersion lacquer (KTL) baths which can be used according to the invention are described in EP-A 082 291, EP-A 234 395, EP-A 209 857, EP-A 227 975, EP-A 178 531, EP-A 333 327, EP-A 310 971, EP-A 456 270, U.S. Pat. No. 3,922,253, EP-A 261 385, EP-A 245 786, DE-A 33 24 211, EP-A 414 199 and EP-A 476 514. These resins may be used on their own or in admixture.

In addition to the base resins and the crosslinking agents which may optionally be present, the electro-dip lacquer (ETL) coating medium may contain pigments, extenders and/or the usual lacquer additives. The pigments comprise the usual inorganic and/or organic pigments. Examples include carbon black, titanium dioxide, iron oxide, kaolin, French chalk or silica. If the coating media are used as anti-corrosion primers they may possibly contain anti-corrosive pigments. Examples of these include zinc phosphate, lead silicate and organic corrosion inhibitors. The type and amount of pigments are oriented towards the purpose of use of the coating media. If clear coatings are required, either no pigments are used or only transparent pigments are used, such as micronised titania or silica, for example. If covering coatings are to be applied, the electro-dip lacquer bath preferably contains colorant pigments.

The pigments may be dispersed to form pigment pastes, e.g. using known paste resins. Resins such as these are familiar to one skilled in the art. Examples of paste resins which can be used in electro-dip lacquer baths are described in EP-A-0 183 025 and in EP-A-0 469 497.

Possible additives comprise the usual additives for electro-dip lacquer coating media. Examples of these include crosslinking agents, neutralising agents, flow media, catalysts, anti-foaming agents and the usual solvents. The crosslinking behaviour may be affected by the type and amount of catalysts. It may be advantageous to formulate the electro-dip lacquer coating medium free from catalysts.

Within the scope of the present invention it is essential that the electro-dip lacquers used have a maximum pigment/vehicle weight ratio of 1:1. Electro-dip lacquers, particularly cathodic electro-dip lacquers, with pigment/vehicle ratios of 0.1:1 to 0.7:1 are preferred.

The electro-dip lacquers used have minimum stoving temperature intervals which are preferably in the range from 80° to 190° C., more preferably from 100° to 180° C., and most preferably below 160° C. The minimum stoving temperature intervals of the electro-dip lacquers may overlap with the minimum stoving temperature intervals of the subsequent aqueous coating media. In this respect, the lower limit of the minimum stoving temperature interval of the electro-dip lacquers is less than the lower limit of the minimum stoving temperature interval of the aqueous coating medium which is applied subsequently. The interval of the electro-dip lacquer layer is most preferably below that of the subsequent layer.

The coating media which can be applied wet-in-wet as a second layer to the uncrosslinked electro-dip lacquer layer according to the invention, e.g. extender materials, are water-thinnable coating media. They contain the usual vehicles, which comprise ionic groups or groups which can be converted into ionic groups. The latter may be cationic groups or groups which can be converted into cationic groups, or anionic groups or groups which can be converted into anionic groups. Examples of preferred groups of the cationic type or of the type which can be converted into the latter include nitrogen-containing groups, such as primary, secondary and tertiary amino groups and quaternary ammonium groups, for example. Examples of groups which can be converted into anionic groups include —COOH, —SO$_3$H and —PO$_3$H$_2$. Vehicles with carboxyl groups, which after at least partial neutralisation with bases ensure that the vehicles are water-thinnable, are particularly preferred. Examples of suitable vehicles include (meth)acrylic copolymers, optionally urethanised polyester resins, polyurethane resins or epoxy resins. The term "(meth)acrylic" used here denotes "methacrylic and/or acrylic". In addition, the vehicles contain hydroxyl groups and, in the case of self-crosslinking systems, additional blocked isocyanate groups in the molecule. In the preferred externally crosslinkable systems the vehicles contain blocked polyisocyanates as crosslinking agents. Crosslinking occurs with the formation of urethane groups and optionally of urea groups both in the externally crosslinkable and in the self-crosslinking systems.

In addition, the water-thinnable coating media which can be applied to the uncrosslinked electro-dip lacquer layer contain the usual pigments, extenders and lacquer additives. They preferably contain no organic polymer particles, however.

The coating media may be formulated as covering lacquers preferably as aqueous primer surfacers, for example. They may also possibly be used as an aqueous intermediate stone impact primer, which can be given a subsequent coat of an aqueous primer surfacer, optionally wet-in-wet, in a further coating step. Examples of cationic vehicles usable in coating media which can be applied as the second layer according to the invention are described in particular in German Patent Application P 41 34 301, which has not yet been laid open to public inspection. The vehicles are preferably based on polyester, polyurethane, acrylate or epoxy resins or mixtures thereof. They contain, at least in part, cationic groups or substituents which can be converted into cationic groups. Substituents which can be converted into cationic groups include amino groups, for example. The amine number of the vehicles is preferably 20 to 200. The solubility in water is affected by the number of cationic groups. The density of crosslinking may be affected by the amount of OH groups. The OH number is preferably 20 to 400. The number average molecular weight (M$_n$) of the cationic vehicles is preferably in the range from 500 to 200,000. The resins may be self-crosslinking (e.g. via blocked NCO groups) or may be externally crosslinkable, i.e. additional crosslinking agents may be added. Isocyanate crosslinking agents are examples of additional crosslinking agents of this type.

The functional amino groups are incorporated in the polyester-based vehicles via an aminoalcohol, for example. Cationic vehicles based on polyester urethanes preferably have a number average molecular weight (M$_n$) of 3000 to 200,000, and preferably have an OH number from 50 to 400. They may be prepared by the reaction of low molecular weight polyesters with diisocyanates, for example. Epoxy resins with cationic groups preferably have a number average molecular weight (M$_n$) of 500 to 20,000, and their OH number is preferably 20 to 400. The acrylate resins preferably have a number average molecular weight (M$_n$) of 500 to 100,000. Their OH number is preferably 30 to 200.

Examples of suitable anionic vehicles for use in coating media which can be applied as the second layer according to the invention are described in DE-A 38 05 629, DE-A 39 36 288 and DE-A 40 00 748. These are vehicles based on polyurethanes and/or polyesters, and which contain COOH groups. They can be converted into an aqueous phase after at least partial neutralisation of the ionic groups. The anionic vehicles preferably have acid numbers of 10 to 100. Their OH numbers are preferably of the order of 20 to 250. Their number average molecular weight (Mn) is preferably of the order of 1600 to 50,000.

Polyurethanes which can be used preferably have a number average molecular weight (M$_n$) of 1600 to 50,000, an OH number of 30 to 200 and an acid number of 10 to 80. They are generally of linear structure, but may also contain branches. The diols, polyols, compounds containing ionic groups and polyisocyanates which can be used for the preparation of these polyurethanes are known. The vehicles contain ionic groups and reactive OH groups, which together with crosslinking agents based on isocyanates can produce chemically crosslinked films.

Examples of polyester resins which can be used are those with an OH number greater than 40 and an acid number greater than 15.

One group of polyester resins which may be used, for example, is optionally modified with urethane. Such resins preferably have a weight average molecular weight (Mw) of 5000 to 50,000, an OH number > 40 and an acid number of 15 to 40. They are prepared by the reaction of polyester polyols, dihydroxycarboxylic acids and diisocyanates by known methods, and converting the product into an aqueous phase. Known, crosslinking agents based on blocked isocyanates are again added to these vehicles. Under the stoving conditions the crosslinking agents react with one another with the formation of urethane groups, and produce a chemically crosslinked film.

One example of another group of polyester vehicles which can be used preferably has a number average molecular weight (M$_n$) of 2000 to 7000. These vehicles have an acid number of 30–100 and an OH number of 50–250. The preparation of polyesters such as these is described in DE-A 38 05 629. Aqueous coating media can also be produced from these vehicles together with blocked isocyanate crosslinking agents, pigments and additives.

German Patent Application P 41 42 816, which has not yet been laid open to public inspection, describes particularly suitable anionic vehicles for coating media, which are suitable for the formulation of coating media to be applied as the second layer according to the invention, particularly for aqueous primer surfacers. These vehicles are water-soluble due to complete or partial neutralisation with bases, and are a reaction product of A) 10 to 80 weight %, preferably 15 to 40 weight %, of a polyurethane resin as the polycarboxyl component, which contains carboxyl groups corresponding to an acid number from 70 to 160 mg KOH/g and at least one blocked terminal isocyanate group in the molecule, which is free from hydroxyl groups and fatty acid radicals with more than 12 C atoms, and which has a limiting viscosity number of from 6.5 to 12.0 ml/g (see DIN 1342, for example), preferably from 8.0 to 11.0 ml/g, measured in dimethylformamide (DMF) at 20° C., with B) 20 to 90 weight %, preferably 60 to 85 weight %, of an optionally urethane-modified polyester resin as the polyhydroxyl component, with a hydroxyl number from 50 to 500 mg KOH/g, an acid number of less than 20 mg KOH/g and a limiting viscosity number from 8.0 to 13.0 mg/ml, preferably from 9.5 to 12.0 ml/g, measured in DMF at 20° C., wherein the reaction product has a limiting viscosity number from 13.5 to 18.0 mg/ml, preferably from 14.5 to 16.5 ml/g, measured in DMF at 20° C.

In the preparation of the reaction product, component (A) may be reacted with component (B) in the absence of solvent or in organic solvents which do not react with isocyanate groups, preferably at a temperature between 90° and 170° C. and most preferably at a temperature which is 10° to 20° C. above the cleavage temperature of the blocking agent for the terminal isocyanate groups of component (A), until a limiting viscosity number of 13.5 to 18.0 ml/g, preferably of 14.5 to 16.5 ml/g, is obtained, measured in DMF at 20° C. without falling below the water-solubility limit, i.e. the condensation product must remain water-thinnable.

The carboxyl groups of the reaction product are subsequently partially or completely neutralised with an inorganic or organic base, then mixed with a blocked polyisocyanate crosslinking agent which is not water-thinnable, preferably at 40° to 100° C., and thinned with water to give a solids content which is suitable for further processing.

The addition of a further crosslinking agent may be effected before or preferably after thinning with water or the formation of the dispersion of the components.

The polyurethane resin used as polycarboxyl component (A) preferably contains one or more dihydroxymonocarboxylic acids as a starting compound, and has an acid number of 70 to 160 mg KOH/g. At least one blocked, terminal isocyanate group is present per molecule. The blocking agent is split off at an elevated temperature, i.e. at the reaction temperature for combination with polyhydroxyl component (B). Moreover, according to its definition polycarboxyl component (A) contains neither hydroxyl groups nor fatty acid radicals with more than 12° C. atoms. Polycarboxyl component (A) on its own, just like the reaction product of (A) and (B), is water-thinnable after partial or complete neutralisation with a base, preferably with a secondary or tertiary alkylamine or alkanolamine.

The polyurethane resin may be obtained in the known manner by the reaction of a mixture of one or more polyisocyanates and one or more polyisocyanates which are partially blocked with monohydroxyl compounds and/or oximes, e.g. butanone oxime, with the dihydroxymonocarboxylic acid or acids and optionally with one or more polyols, the proportions of the ingredients being selected so that on average at least one blocked terminal isocyanate group is present in the molecule of the polycarboxyl component (A), which is free from hydroxyl groups.

Dimethylol propionic acid is preferably used as the dihydroxymonocarboxylic acid. Other dihydroxymonocarboxylic acids are also suitable in principle.

Commercially-available diisocyanates, such as toluene diisocyanate, isophorone diisocyanate or hexamethylene diisocyanate, and optionally suitable isocyanate prepolymers also, are preferably used as the polyisocyanate compounds.

Monohydroxyl compounds, particularly monoalcohols such as 2-ethylhexanol, monoethers of glycols and polyoxyalkylene diols or butanone oxime, for example, are selected for blocking the free NCO groups, so that they are split off during the reaction of polycarboxyl component (A) with polyhydroxyl component (B), i.e. the cleavage temperature should lie between 80° and at most 160° C. Polycarboxyl component (A) has a limiting viscosity number of 6.5 to 12.0 ml/g, preferably of 8.0 to 11.0 ml/g, measured in DMF at 20° C. (see DIN 1342, for example).

Film-forming polyester resins are used as polyhydroxyl component (B). These are characterised by a hydroxyl number of 50 to 500 mg KOH/g, an acid number of less than 20 mg KOH/g and a limiting viscosity number of 8.0 to 13.0 ml/g, preferably of 9.5 to 12.0 ml/g, measured in DMF at 20° C. The polyester resins prepared from polyols and polycarboxylic acids may optionally contain urethane groups and may be modified with monocarboxylic acids containing 5° to 20° C. atoms, for example. However, the fatty acid content should preferably not exceed 15 weight %.

Components (A) and (B) are reacted at 90° to 170° C. for example, preferably at a temperature which is 10° to 20° C. above the cleavage temperature of the blocking agent for the terminal isocyanate groups in polycarboxyl component (A), until a limiting viscosity number of 13.5 to 18.0 ml/g, preferably 14.5 to 16.5 ml/g, is obtained, measured in DMF at 20° C. In this connection it must be ensured that the reaction product is still perfectly water-thinnable after neutralisation of the carboxyl groups. The water-thinnability is affected by the number of hydrophilic groups, particularly the groups which can be neutralised. The proportions of the ingredients are 10 to 80 weight %, preferably 15 to 40 weight %, for component (A), and 20 to 90 weight %, preferably 60 to 85 weight %, for component (B), based on the solid, the sum of the percentages being 100 in each case, and the proportions being selected so that the reaction product has an acid number of at least 25 mg KOH/g, preferably between 30 and 50 mg KOH/g.

The reaction product is subsequently mixed, before or after partial or complete neutralisation of the carboxyl groups by means of inorganic or organic bases, but before the addition of a significant proportion of water, with the blocked polyisocyanate crosslinking agent which is not water-thinnable on its own, and thinned with water to give a solids content suitable for further processing. Due to the additional combination, which is stable towards hydrolysis, of polycarboxyl component (A) with polyhydroxyl component (B) via the urethane group, due to the selection of specific raw materials for polycarboxyl component (A) in order to improve the compatibility of the reaction product with the blocked isocyanate, and due to the admixture of the blocked polyisocyanate before the addition of a significant proportion of water, the storage stability or the shear stability of the lacquers formulated using the vehicle combinations described above is significantly increased.

Secondary or tertiary alkylamines or alkanolamines are preferably used as the bases for the neutralisation of the carboxyl groups of the reaction product from the above-mentioned components (A) and (B). Bases of this type are generally preferably used for the neutralisation of acid groups of the vehicles with groups which can be converted into anionic groups and which are present in the second coating medium used according to the invention.

The aqueous coating media to be applied wet-in-wet on to uncrosslinked electro-dip lacquer layers according to the invention may contain blocked polyisocyanates, for example, which permit crosslinking with the formation of urethane groups and optionally with the formation of urea groups on stoving.

Commercially available blocked polyisocyanates, such as blocked diisocyanates for example, which preferably have a low content of organic solvents may be used as crosslinking components; they may also be used as mixtures. They comprise the known aromatic or aliphatic polyisocyanates which are customary in the lacquer industry. Aliphatic polyisocyanates are preferred. Oligomeric reaction products of diisocyanates may also be used, e.g. isocyanurates, biurets, allophanates or reaction products with low molecular weight polyols such as trimethylol propane, neopentyl glycol or glycerine. The amount of blocked polyisocyanate is 10 to 40 weight % for example, based on the total solid resin content of the vehicle and crosslinking agent.

The usual known blocking agents are suitable as blocking agents here. Examples of these include oximes, lactams, monohydric alcohols or amines. The crosslinking temperature of the coating medium may be influenced by the blocking agent.

Irrespective of the isocyanate crosslinking agents which can be used, it is possible for the vehicle to contain chemically incorporated blocked isocyanate groups. The vehicle is then a self-crosslinking vehicle which requires no additional isocyanate crosslinking agent.

Another group of crosslinking agents which can be used in addition to the blocked isocyanate crosslinking agents for the aqueous coating medium used according to the invention comprises aminoplast resins, such as melamine or benzoguanamine resins, for example. These are the usual products familiar to one skilled in the art, which are also commercially available. They may or may not be water-thinnable. It is also possible to use them as additional crosslinking agents in self-crosslinking systems.

Fully- or partially alkylated methanol- and/or butanol-etherified derivatives, preferably of the tetramethylol type, are used as the benzoguanamine resins, for example.

Methanol- and/or (iso)butanol-etherified derivatives, preferably derived from hexamethylol melamine, are used as the melamine resins, for example. Water-soluble, partially alkylated resins derived from hexamethylol melamine are particularly preferred. Methanol is the preferred etherification alcohol.

The aminoplast resins may be used on their own or in admixture in quantitative proportions of 2–30 weight %, based on the total solid resin content of the vehicle and crosslinking agent. The quantitative proportion is preferably 5–25 weight %, most preferably 8–16 weight %, of melamine and/or benzoguanamine resin.

No detailed mention is required for one skilled in the art to the effect that the amount of aminoplast resin in the final aqueous coating medium can be matched to the amount of blocked polyisocyanate which is present in the final aqueous coating medium, i.e. the amount of aminoplast resin can be varied depending on the amount of blocked polyisocyanate or its content of latent isocyanate groups as determined by its chemical synthesis. In this respect the sum of the blocked polyisocyanate and of the optional additional crosslinking agents should not exceed 50 weight %, based on the total vehicle content.

The usual inorganic extenders and/or inorganic and/or organic pigments may be used in the aqueous coating media which can be employed as the second layer according to the invention. The coating media preferably contain no organic extenders.

The above-mentioned pigments and extenders may be inorganic pigments and extenders, e.g. carbon black, titanium dioxide, finely dispersed silica, aluminium silicate (e.g. kaolin), magnesium silicate (e.g. French chalk), calcium carbonate (e.g. chalk), barium sulphate (e.g. barytes) and various pigments, such as iron oxide pigments or phthalocyanine pigments, for example, or anti-corrosion pigments such as lead or chromate compounds for example.

In addition, these coating media may contain the usual industrial lacquer additives, e.g. rheology-influencing agents, anti-settling agents, flow media, anti-foaming agents, deaeration agents, dispersion agents or catalysts. These are employed for special uses of lacquer or to impart properties required by the application technology. Adhesion-improving additives, such as water-thinnable, epoxy resin-modified alkyd resins or epoxy resin phosphoric acid esters, for example, may also optionally be added to the coating media.

The aqueous coating media used according to the invention may also contain one or more organic solvents. The usual industrial lacquer solvents are suitable as solvents, for example. These may stem from the manufacture of the vehicle. It is beneficial if the solvents are at least partially miscible with water.

Examples of such solvents include glycol ethers, e.g. diethylene glycol dimethyl ether, butyl glycol, ethoxypropanol or butyl diglycol, alcohols e.g. isopropanol, n-butanol, glycols e.g. ethylene glycol, N-methyl pyrrolidone, and ketones. The flow properties and the viscosity of the coating medium may be influenced by the selection of the solvents. The evaporation behaviour may be affected by the boiling point of the solvents used.

Depending on the type and amount of the pigments or extenders used, the pigment-vehicle ratio (PBV) is 0.8 to 2.5 for example, and is preferably 1.2 to 1.8 for aqueous primer surfacers. The solids content of the coating medium is preferably between 25 and 60 weight %, most preferably 30 to 55 weight %. The solvent content is up to 15 weight %, for example, preferably up to 10 weight %, based on the aqueous coating medium in each case.

The aqueous coating media which can be used according to the invention are produced, for example, by dispersing extenders or pigments in a portion of the amount of aqueous vehicle mixture to be used the final coating medium, optionally with the addition of suitable dispersing agents and anti-foaming agents, in suitable dispersion units, such as a bead mill, for example, in the manner known to one skilled in the art. The particle size of the pigments and/or extenders after dispersion is preferably less than 15 μm.

The dispersion is then mixed with the remaining portion of the aqueous resin composition, and further constituents which are required in the final aqueous coating medium are optionally added thereafter with intensive mixing.

It may be beneficial to adjust the pH of the coating media, which are preferably anionically stabilised, to a value of 7.8–8.8, preferably 8.2–8.4, by the addition of amines or aminoalcohols, preferably secondary or tertiary alkylamines or alkanolamines.

The viscosity can thereafter be adjusted with water. The final coating medium can be stored for a very long time and exhibits no significant change in viscosity or in its sedimentation tendency. A suitable low viscosity for application, e.g. for spraying, can optionally be obtained using water.

According to the invention, the pigment loadings of the two coating media for the first and second layers should be compatible with each other. In this respect, the ratio of the PBV of the electro-dip primer coat to the PBV of the second layer should be 0 to 1.8. The PBV (electro-dip lacquer) : PBV (second layer) ratio is preferably from 0.05 to 1.0.

Electrically conductive materials, such as metals for example, are suitable as the substrate for the process according to the invention. Automobile bodywork systems or parts thereof are suitable. These may consist of metal, or of plastic which is electrically conductive or which is provided with an electrically conductive film. The first coating layer, particularly in the form of an anti-corrosion primer coat, is electrophoretically deposited on this substrate in the usual manner.

This may be rinsed with an aqueous solution to remove non-adhering excess lacquer components and thereafter preferably freed from adhering moisture before the wet-in-wet application of the subsequent coating medium. This is effected, for example, by the passage of air, and may be carried out, for example, using infrared radiation and/or using an optionally heated air stream which is passed over the substrate. The temperature of the air stream may be from room temperature to 120° C., for example. No crosslinking of the electro-dip lacquer film should occur during this operation.

The second layer, e.g. the layer of a primer surfacer, is applied to the substrate provided with an uncrosslinked electro-dip lacquer layer obtained in this manner. The coating medium is preferably applied by spraying. Examples of suitable spraying techniques include compressed air spraying, airless spraying or ESTA high rotation spraying. After a short aeration time, optionally at elevated temperatures up to 80° C., the workpiece with the two coating layers is stoved at a temperature between 130° and 200° C., preferably above 150° C. The total layer thickness is 30 to 150 μm, for example, preferably 40 to 90 μm. After stoving, the surface may optionally be further processed, e.g. by polishing, to remove blemishes. Thereafter, further colorant and/or effect-producing lacquer layers, e.g. a single-colour covering lacquer or a base lacquer, preferably a water-based lacquer, may be applied to this two-layer coating.

The coatings produced by the process according to the invention have good, optically flat surfaces. The bonding between the electro-dip lacquer primer coat and the second layer is good. A firm bond is obtained between the two layers. Surface defects such as craters or bubbles can be prevented due to the matched minimum stoving temperature intervals. Good flow properties and good edge coverage are obtained due to the compatible pigment loadings of the two layers. If additional subsequent layers are applied, both the bonding and the surface smoothness are good.

The procedure according to the invention enables optically flat, stone impact-resistant, multilayer coatings with good mechanical properties to be produced, which satisfy the coating requirements in the production of automobiles. The process according to the invention makes it possible to reduce the number of stoving steps without at the same time having to accept disadvantages such as those which arise in the prior art, namely restricted processability, mechanical properties in need of improvement, and unsatisfactory bonding of intermediate layers.

The following examples serve to explain the invention.

EXAMPLE 1

A lead-free cataphoresis lacquer was prepared according to EP-0 414 199-A2, Table 3, vehicle combination 2. The cataphoresis lacquer contained 0.5 parts carbon black, 35.5 parts titanium dioxide and 5 parts hexyl glycol, each based on 100 parts solid resin.

The minimum stoving temperature interval of this cataphoresis lacquer was ascertained as follows:

A lacquer layer with a dry layer thickness of 20 μm was formed by cathodic deposition in each case on the usual test plates of bodywork steel. After rinsing off excess portions of lacquer with demineralised water and drying for five minutes at 80° C. (specimen temperature) in a drying oven (air ventilation operation), the test plates were stoved for 20 minutes at specimen temperatures which differed by 10° C. steps, starting from 120° C. After cooling to room temperature and storage for four hours, a swab soaked in acetone and covered with a watch glass was placed on each test coupon for two minutes. One minute after removing the swab, the crosslinking was tested by scratching with a thumb nail, at a pressure corresponding to 4 kg, on the area which had been exposed to the solvent. The lacquer layers stoved at 120°, 130° and 140° C. could be removed by this procedure. The lacquer layers stoved at 150° C. and 160° C. withstood the attempts to remove them. The minimum stoving temperature interval was thus 140° to 160° C.

EXAMPLE 2 (PREPARATION OF AN AQUEOUS PRIMER SURFACER)

A) Preparation of Polycarboxyl Component A

A solution of 945 parts (7 mole) dimethylol propionic acid in 1079 parts diethylene glycol dimethyl ether (DGM) and 599 parts methyl isobutyl ketone (MIBK) was placed in a suitable reaction vessel. A mixture of 1044 parts (6 mole) TDI and 528 parts (2 mole) of a TDI which was half blocked with ethylene glycol monoethyl ether was added to this solution over 4 hours at 100° C. As soon as all the NCO groups had reacted, the batch was diluted with a mixture of DGM and MIBK (2:1) to a solids content of 60%. Component A had an acid number of 140 mg KOH/g and a limiting viscosity number of 10.2 ml/g, measured in N,N-dimethylformamide (DMF) at 20° C.

B) Preparation of Polyhydroxyl Component B 38 parts (0.2 mole) tripropylene glycol, 125 parts (1.2 mole) neopentyl glycol, 28 parts (0.1 mole) isomerised linoleic acid, 83 parts (0.5 mole) isophthalic acid and 58 parts (0.3 mole) trimellitic anhydride were esterified at 230° C. in a suitable reaction vessel to give an acid number of less than 4 mg KOH/g. The viscosity of a 50% solution in ethylene glycol monobutyl ether in accordance with DIN 53211/20° C. was 165 seconds; the limiting viscosity number was 10.5 ml/g, measured in N,N-dimethylformamide at 20° C.

C) Preparation of Vehicle Component (I)

30 parts of component A and 70 parts of component B were mixed with each other, and the solvent which was present was substantially removed under vacuum whilst heating to the reaction temperature of 150°-160° C. The reaction was conducted in 90% solution in DGM. The temperature of 150°-160° C. was maintained until an acid number of 35-39 mg KOH/g and a limiting viscosity number of 16.0, measured in N,N-dimethylformamide at 20° C., were obtained, whereupon a sample after neutralisation with dimethyl ethanolamine was perfectly water-thinnable.

D) Preparation of the Aqueous Vehicle Mixture I+II 65 parts of component (I) were mixed at 40°-100° C. with 35 parts of crosslinking component (II), a commercially available polyisocyanate blocked with butanone oxime (a trimeric hexamethylene diisocyanate with an isocyanurate structure, e.g. Desmodur N 3390 [Bayer]), and adjusted to a degree of neutralisation of 90% with dimethyl ethanolamine. The mixture was then diluted with deionised water to a solids content of 40%.

0.7 parts carbon black, 1 part titanium dioxide, 18.3 parts barium sulphate and 2 parts French chalk were stirred into 36 parts of the above-mentioned 40% aqueous vehicle mixture obtained in D) and intensively mixed using a dissolver. Thereafter this mixture was intensively milled in a bead mill and made into a lacquer with 18 parts of the 40% aqueous composition obtained in the preceding example D) and 19.6 parts deionised water.

3 parts butyl glycol, 0.3 parts triethanolamine, 0.2 parts of a polyether-modified dimethyl polysiloxane copolymer (a commercially available flow additive) and 1 part of a 10% solution of a polysiloxane copolymer (commercially available anti-foaming agent) were added to the dissolver and intensively mixed.

EXAMPLE 3

The procedure was analogous to that employed in Example 2, with the difference that instead of 19.6 parts deionised water only 17.1 parts deionised water were used, and in addition 2.5 parts of an 80% butanolic solution of a butanol-etherified benzoguanamine resin of the tetramethylol type were added to the dissolver in the last step.

The aqueous primer surfacer compositions described in Examples 2 and 3 were adjusted to the processing viscosity using deionised water and were sprayed on to test plates of bodywork steel.

The dry film thickness was 35 μm in each case. After drying for 5 minutes at 80° C. the test plates were stoved as described in Example 1 and the minimum stoving temperature interval was determined in each case. Both aqueous primer surfacers gave an identical result. The lacquer films stoved at 120°, 130°, 140°, 150° and 160° C. could be removed. The lacquer films stoved at 170° and 180° C. withstood the attempts to remove them. The minimum stoving temperature interval for both aqueous primer surfacers was thus 160° to 180° C.

Production of multilayer coatings:

EXAMPLE 4 (COMPARATIVE EXAMPLE)

The cataphoresis lacquer as in Example 1 was applied to a test plate of bodywork steel by cathodic deposition to give a dry film thickness of 20 μm. After rinsing off excess portions of lacquer with demineralised water the sample was stoved for 25 minutes at 180° C. (specimen temperature). The aqueous primer surfacer from Example 2 was sprayed on to the cooled substrate to give a dry film thickness of 35 μm. After aeration for 5 minutes at room temperature, the sample was dried for 10 minutes at 80° C. (specimen temperature) and then stoved for 15 minutes at 165° C. (specimen temperature). After cooling, half of the coated test plate was masked, and a commercially available single-coat covering lacquer suitable for the OEM—* coating of automobiles was sprayed on to give a dry film thickness of 40 μm and stoved for 30 minutes at 130° C. (specimen temperature).

EXAMPLE 5 (COMPARATIVE EXAMPLE)

The procedure employed was analogous to that of Example 4, with the difference that the aqueous primer surfacer from Example 3 was used.

EXAMPLE 6 (ACCORDING TO THE INVENTION)

The cataphoresis lacquer as in Example 1 was applied to a test plate of bodywork steel by cathodic deposition to give a dry film thickness of 20 μm (produced when stoved on its own). After rinsing off excess portions of lacquer with demineralised water and drying for 5 minutes at 80° C. (specimen temperature) in a drying oven (air ventilation operation) the hydraulic extender from Example 2 was sprayed on to give a dry film thickness of 35 μm (produced when stoved on its own). After aeration for 5 minutes at room temperature, the sample was dried for 10 minutes at 80° C. (specimen temperature) and then stoved for 15 minutes at 165° C. (specimen temperature). After cooling, half of the coated test plate was masked, and a commercially available single-coat covering lacquer suitable \* OEM=original equipment manufacturer for the OEM— coating of automobiles was sprayed on to give a dry film thickness of 40 μm and stoved for 30 minutes at 130° C. (specimen temperature).

EXAMPLE 7 (ACCORDING TO THE INVENTION)

The procedure was analogous to that employed in Example 6, except that the aqueous primer surfacer from Example 3 was used.

The multilayer coatings obtained from Examples 4–7 gave good results in the cross-cut test (DIN 53151), in the VDA [Automobile Industry Association] stone impact test (tested using a VDA stone impact test unit manufactured by Erichsen, Model 508 at +20° C. with 1 kg angular 4–5 mm steel scrap, accelerated by compressed air at 3 bar) and in the stone impact test according to the "SPLITT-Methode" (testing by means of a stone impact simulation unit as in "Farbe und Lack", 8/1984, pages 646–653).

The following Table lists the discriminatory technological test results obtained for the two-layer coatings of cathodic electro-dip lacquer and aqueous primer surfacer from Examples 4 to 7:

| Example Number 3) | Impact test 1) kg × m (inch × pound) | Erichsen indentation 2) mm |
|---|---|---|
| 4 | 0.4609 good (40 good) | 4.9 |
| 5 | 0.1728 good | 8.0 |

-continued

| Example Number 3) | Impact test 1) kg × m (inch × pound) | Erichsen indentation 2) mm |
|---|---|---|
|   | (15 good) |   |
| 6 | 0.9217 good | 7.8 |
|   | (80 good) |   |
| 7 | 0.9217 good | 7.7 |
|   | (80 good) |   |

1) 0.9072 kg, 15.875 mm (2 pound, ⅝ inch); beating out; at room temperature according to ASTM D 27 94
2) at room temperature according to DIN 53 1 56
3) Two-layer structure without covering lacquer.

We claim:

1. A process for producing multilayer coatings by the electrophoretic deposition of a first coating layer of a first aqueous coating medium on an electrically conducting substrate, the application of a second coating layer based on a second aqueous coating medium, and jointly stoving the coating layers thus obtained, characterised in that a coating medium is used for the second coating layer which is based on one or more vehicles stabilised by ionic groups in the aqueous coating medium, which vehicles cross-link during stoving with the formation of urethane groups, wherein the coating medium is selected so that the maximum pigment/vehicle weight ratio of the first coating medium is 1:1, that the ratio of the pigment/vehicle weight ratio of the first coating medium to the pigment/vehicle weight ratio of the second coating medium has a value of up to 1.8, and that the minimum stoving temperature interval for the second coating layer is above that for the first coating layer or overlaps the latter so that the lower limit of the interval for the second coating layer is above the lower limit of the interval for the first coating layer.

2. A process according to claim 1, characterised in that the coating media are selected so that the minimum stoving temperature interval for the second coating is above that for the first coating.

3. A process according to claim 1, characterised in that the coating media are selected so that the ratio of the pigment/vehicle weight ratio of the first coating medium to that of the second coating medium has a value of 0.05 to 1.0.

4. A process according to claim 1, characterised in that a coating medium which additionally cross-links on stoving with the formation of urea groups is used as the second coating medium.

5. A process according to claim 1, characterised in that a coating medium which is free from organic polymer particles is used as the second coating medium.

6. A process according to claim 1, characterised in that one or more further coating layers are applied to the second coating layer.

7. A process according to claim 6, characterised in that a third coating layer is applied wet-in-wet to the second coating layer and is subsequently jointly stoved.

8. A process according to claim 1, characterised in that a coating medium based on one or more vehicles with cationic groups and/or groups which can be converted to cationic groups, or with anionic groups and/or groups which can be converted to anionic groups, and with an OH number of 20 to 400, is used for the production of the second coating layer.

9. A process according to claim 8, characterised in that the vehicle is based on one or more polyester resins, polyurethane resins, polyepoxy resins and/or acrylate resins.

10. A process according to claim 8 or 9, characterised in that the vehicle is self-crosslinking and contains blocked isocyanate groups in the molecule.

11. A process according to claim 8, characterised in that the vehicle is externally cross-linkable and is used together with one or more blocked polyisocyanates and optionally aminoplast resins as the cross-linking agent.

12. A process according to claim 1, characterised in that an aqueous coating medium is used for the production of the second coating layer, which aqueous coating medium is based on one or more vehicles which are water-soluble due to complete or partial neutralisation with bases and which comprise the reaction product of A) 10 to 80 weight %, preferably 15 to 40 weight %, of a polyurethane resin as a polycarboxyl component, which contains carboxyl groups corresponding to an acid number from 70 to 160 mg KOH/g and at least one blocked terminal isocyanate group in the molecule, which is free from hydroxyl groups and fatty acid radicals with more than 12° C. atoms, and which has a limiting viscosity number of from 6.5 to 12.0 ml/g (see DIN 1342, for example), preferably from 8.0 to 11.0 ml/g, measured in dimethylformamide (DMF) at 20° C., with B) 20 to 90 weight %, preferably 60 to 85 weight %, of an optionally urethane-modified polyester resin as a polyhydroxyl component, with a hydroxyl number from 50 to 500 mg KOH/g, an acid number of less than 20 mg KOH/g and a limiting viscosity number from 8.0 to 13.0 mg/ml, preferably from 9.5 to 12.0 ml/g, measured in DMF at 20° C, wherein the reaction product has a limiting viscosity number from 13.5 to 18.0 mg/ml, preferably from 14.5 to 16.5 ml/g, measured in DMF at 20° C.

13. A process according to claim 12, characterised in that the coating medium contains one or more blocked polyisocyanates and optionally aminoplast resins as a cross-linking agent.

14. A process according to claim 1, characterised in that a layer of a primer surfacer, a covering lacquer layer or a base lacquer layer is applied as the second coating medium layer for multilayer coatings.

15. A process according to claim 1, characterised in that it is carried out for the production of multilayer coatings on motor vehicle bodywork or parts thereof.

* * * * *